US009262304B2

(12) United States Patent
Knych et al.

(10) Patent No.: US 9,262,304 B2
(45) Date of Patent: Feb. 16, 2016

(54) METHODS AND SYSTEMS FOR TESTING INTERACTIONS BETWEEN MOBILE APPLICATIONS

(71) Applicant: Google Inc., Mountain View, CA (US)

(72) Inventors: Thomas William Knych, San Francisco, CA (US); Valeriy S Zakharov, Berkeley, CA (US)

(73) Assignee: Google Inc., Mountain View, CA (US)

(*) Notice: Subject to any disclaimer, the term of this patent is extended or adjusted under 35 U.S.C. 154(b) by 286 days.

(21) Appl. No.: 14/030,320

(22) Filed: Sep. 18, 2013

(65) Prior Publication Data

US 2015/0067656 A1 Mar. 5, 2015

Related U.S. Application Data

(60) Provisional application No. 61/874,071, filed on Sep. 5, 2013.

(51) Int. Cl.
G06F 9/44 (2006.01)
G06F 11/36 (2006.01)
H04W 4/00 (2009.01)

(52) U.S. Cl.
CPC ............. G06F 11/3664 (2013.01); H04W 4/00 (2013.01)

(58) Field of Classification Search
None
See application file for complete search history.

(56) References Cited

U.S. PATENT DOCUMENTS

| | | | | |
|---|---|---|---|---|
| 5,671,351 A * | 9/1997 | Wild | ................... | G06F 11/3688 714/38.13 |
| 6,654,877 B1 * | 11/2003 | Huck | ................. | G06F 9/30181 712/227 |
| 7,478,026 B1 * | 1/2009 | Kushner | .............. | G06F 17/5009 703/13 |
| 8,271,608 B2 | 9/2012 | Mahaffey et al. | | |
| 8,296,736 B2 | 10/2012 | Jones et al. | | |
| 2004/0260993 A1 * | 12/2004 | Griffin | ................ | G06F 11/3414 714/743 |
| 2007/0143093 A1 * | 6/2007 | Alvey | ................. | G06F 11/3696 703/22 |
| 2012/0218902 A1 | 8/2012 | Kirtley et al. | | |
| 2012/0233123 A1 * | 9/2012 | Shisheng | .............. | G06F 11/004 707/639 |
| 2012/0233629 A1 | 9/2012 | Swildens | | |
| 2012/0284695 A1 * | 11/2012 | Olsa | .................... | G06F 11/3696 717/124 |
| 2012/0331353 A1 | 12/2012 | Pal et al. | | |

OTHER PUBLICATIONS

Junit, http://www.junit.org, visited and printed from internet on Sep. 25, 2013 and Oct. 3, 2013.
Native Driver, http://www.code.google.com/p/nativedriver/, visited and printed from internet on Sep. 25, 2013.

(Continued)

*Primary Examiner* — Shih-Wei Kraft
(74) *Attorney, Agent, or Firm* — McDonnell Boehnen Hulbert & Berghoff LLP

(57) ABSTRACT

A shared platform included in a device can be configured to execute instructions from a first application and a second application to operate the device. The shared platform can be configured to receive mode instructions from the first application indicative of operating in a test mode where the shared platform provides simulated responses to the first application. The shared platform can receive a request from the first application pertaining to an operation of the second application. The shared platform operating in the test mode can determine a response to the request from the first application based on a simulation of providing the request to the second application.

12 Claims, 7 Drawing Sheets

(56) References Cited

OTHER PUBLICATIONS

Mockito, http://mockito.org, visited and printed from internet on Sep. 25, 2013.

Robotium, http://code.google.com/p/robotium, visited and printed from internet on Oct. 3, 2013.

* cited by examiner

METHODS AND SYSTEMS FOR TESTING INTERACTIONS BETWEEN MOBILE APPLICATIONS

CROSS-REFERENCE TO RELATED APPLICATION

The present disclosure claims priority to U.S. Provisional Patent Application Ser. No. 61/874,071, filed on Sep. 5, 2013, the entirety of which is herein incorporated by reference.

BACKGROUND

Unless otherwise indicated herein, the materials described in this section are not prior art to the claims in this application and are not admitted to be prior art by inclusion in this section.

An application in a mobile platform can be designed to solve a single activity or problem, and delegate other activities to other applications when needed. For example, an image editing application that edits an image may delegate capturing an image to a camera application, and sharing the image to an email application. Thus, a user of the mobile platform can receive an integrated experience and an application developer can focus on implementing the application's unique functionality.

Automating testing of interactions between two applications on the mobile platform can pose a problem due to the mobile platform preventing automated control of multiple applications by the same test procedure for security purposes. In one example, a test for a first application can fail due to a second application updating its user interface even if the second application continues to satisfy the contract of integration with the first application. In another example, a range of output from the second application may not be known by an author of the first application. Thus, in this example, the author of the first application may not be able to test specific cases (e.g., invalid output, boundary case, etc.).

SUMMARY

In one example, a method is provided that comprises receiving mode instructions from a first application. The mode instructions can be received by a shared platform included in a device and configured to execute instructions to operate the device. The mode instructions can be executable by the shared platform to cause the shared platform to operate in a test mode or a runtime mode. The test mode can correspond to the shared platform providing simulated responses to the first application and the runtime mode can correspond to the shared platform executing operating instructions from the first application to operate the device. The method further comprises determining that the shared platform operates in the test mode based on the mode instructions. The method further comprises receiving a request from the first application by the shared platform. The request can correspond to an operation of a second application also configured to provide operating instructions executable by the shared platform to operate the device. The method further comprises determining, by the shared platform operating in the test mode, a response to the request from the first application based on a simulation of providing the request to the second application.

In another example, a method for testing interaction between a first application and a second application that are each configured to provide operating instructions executable by a shared platform included in a first device to operate the first device is provided. The method comprises receiving mode instructions from a first application. The mode instructions can be received by a test platform included in a second device and configured to simulate operation of the shared platform. The mode instructions can correspond to a simulated interaction mode indicative of the test platform providing simulated responses to the first application based on requests received from the first application. The method further comprises receiving a request from the first application by the test platform. The request from the first application can be for information output by the second application due to an operation of the second application. The method further comprises determining a response, by the test platform operating in the simulated interaction mode, to the request from the first application based on a simulation of providing the request to the second application and a simulation of receiving the information output from the second application.

In another example, a computer readable medium is provided. The computer readable medium can have instructions stored therein that when executed by a computing device cause the computing device to perform functions. The functions comprise receiving mode instructions from a first application. The mode instructions can be received by a shared platform included in the computing device and configured to execute instructions to operate the computing device. The mode instructions can be executable by the shared platform to cause the shared platform to operate in a test mode or a runtime mode. The test mode can correspond to the shared platform providing simulated responses to the first application and the runtime mode can correspond to the shared platform executing operating instructions from the first application to operate the computing device. The functions further comprise determining that the shared platform operates in the test mode based on the mode instructions. The functions further comprise receiving a request from the first application by the shared platform. The request can correspond to an operation of a second application also configured to provide operating instructions executable by the shared platform to operate the computing device. The functions further comprise determining, by the shared platform operating in the test mode, a response to the request from the first application based on a simulation of providing the request to the second application.

These as well as other aspects, advantages, and alternatives, will become apparent to those of ordinary skill in the art by reading the following detailed description, with reference where appropriate to the accompanying figures.

DETAILED DESCRIPTION

Figure 1:
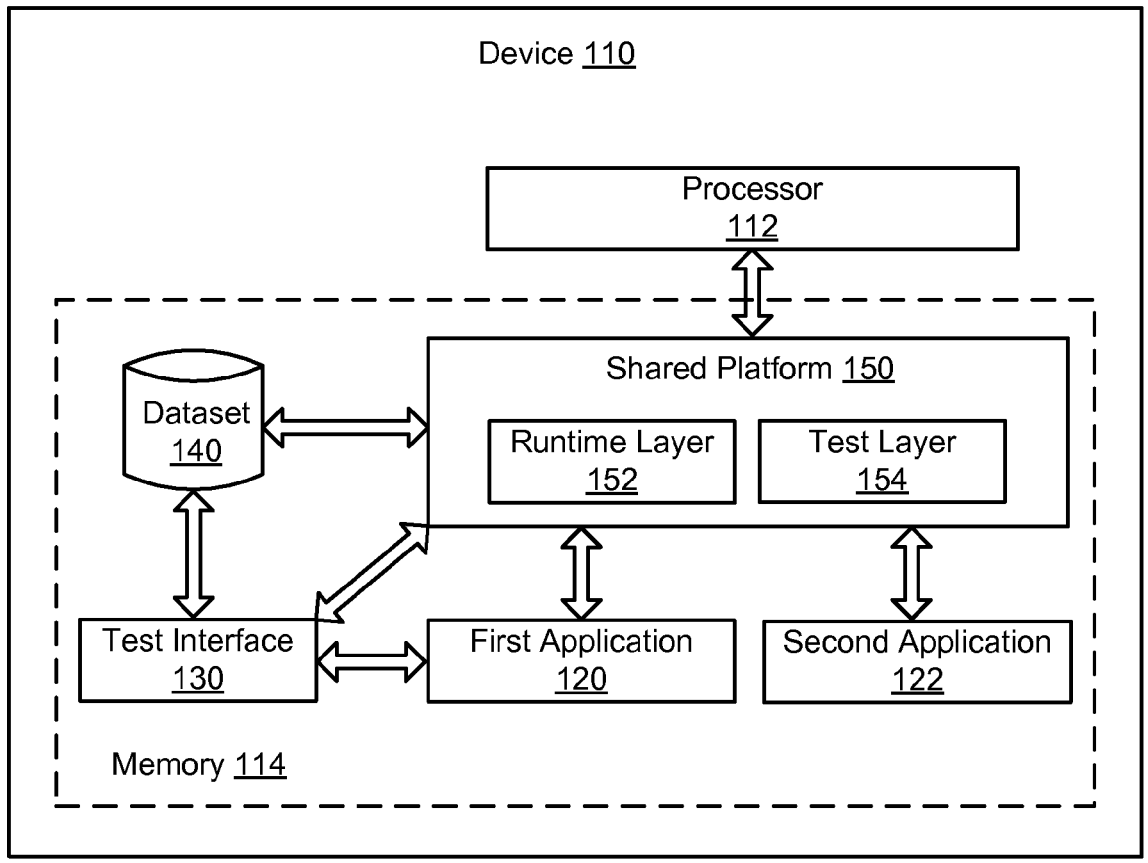
FIG. 1 is a block diagram of an example system including a device operated by a shared platform.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

An electronic device can include a shared platform configured to execute instructions from one or more applications to operate the electronic device. Within examples described herein, a method of testing interaction between two or more applications that provide operating instructions to a shared platform configured to operate a device is provided. The device can be, for example, a digital camera, computing device, wearable device, mobile device, cellular phone, tablet, etc. The method can include providing simulated responses to a first application of the two or more applications based on a simulation of providing requests from the first application to a second application of the two or more applications. In some examples, the provision of the simulated responses can be performed by the shared platform. In other examples, the provision of the simulated responses can be performed by a test platform included in a second device and configured to provide the simulated responses to the first application based on the first application being included in the second device.

Within a specific example, a method is provided that includes receiving mode instructions from a first application. The mode instructions can be received by a shared platform included in a device and configured to execute instructions to operate the device. The mode instructions can be executable by the shared platform to cause the shared platform to operate in a test mode or a runtime mode. The test mode can correspond to the shared platform providing simulated responses to the first application and the runtime mode can correspond to the shared platform executing operating instructions from the first application to operate the device. The method can also include determining that the shared platform operate in the test mode based on the mode instructions. The method can also include receiving, by the shared platform, a request from the first application. The request can correspond to an operation of a second application also configured to provide operating instructions executable by the shared platform to operate the device. The method can also include determining, by the shared platform operating in the test mode, a response to the request from the first application based on a simulation of providing the request to the second application.

In some examples, the shared platform can be configured to execute the operating instructions from the first application and the second application to operate the device. For example, the first application and the second application can be included in the device, and the shared platform can receive the operating instructions to operate the device.

In some examples, the response can correspond to a simulated response from the second application. Thus, in these examples, the response can have a format substantially same as a format of the simulated response. In other examples, the response can be indicative of the shared platform simulating that the second application received the request from the first application.

In some examples, the method can also include the shared platform providing the response to the first application. In some examples, the method can also include receiving a second request from the first application indicative of the first application requesting the response. For example, the provision of the response to the first application by the shared platform can be based on the shared platform receiving the second request.

In some examples, the device can include a dataset accessible by the shared platform. The dataset can include a plurality of test requests from the first application and a plurality of corresponding test responses from the second application. In these examples, the method can include determining a given test request of the plurality of test requests included in the dataset that is substantially same as the request from the first application. Additionally, the method can also include determining a given test response of the plurality of test responses that corresponds to the given test request. Additionally, the method can also include providing the given test response as the response to the first application.

In some examples, the device can include a test interface configured to receive information from the first application based on instructions from the shared platform. For example, the method can include receiving, by the test interface, test information relating to simulated communication between the first application and the second application. In this example, the method can also include determining, based on the test information, the plurality of test requests and plurality of test responses described in the examples above. Additionally, the method can include the test interface determining the dataset accessible by the shared platform including the plurality of test requests and the plurality of test responses.

In some embodiments of the present disclosure that include a test platform that is included in a second device other than the device that includes the shared platform, the functions described above performed by the shared platform can be performed by the test platform. For example, the dataset described above can be included in the second device, and the test platform can be configured to obtain the plurality of test requests and the plurality of test responses from the dataset to provide the simulated responses to the first application.

Some embodiments of the present disclosure therefore provide systems and methods for testing interaction between a first application and a second application without invoking the second application. For example, simulated responses to requests from the first application that pertain to operations of the second application can be provided without actually sending the requests to the second application.

FIG. 1 is a block diagram of an example system 100 including a device 110 operated by a shared platform 150. The device 110 includes a processor 112 and a memory 114 comprising instructions executable, via the shared platform 150, by the processor 112 to operate the device 110. The memory 114 can include a first application 120, a second application 122, a test interface 130, a dataset 140, and the shared platform 150.

The device 110 can include a computing device such as a smart phone, digital assistant, digital electronic device, digital camera, body-mounted computing device (e.g., eyeglasses with computing capability), or any other computing device configured to execute instructions by the shared platform 150 to operate the device 110. Although not illustrated in FIG. 1, the device 110 can include additional components, such as input buttons, a display, a touch screen display, a camera, an antenna, a keyboard, or any other physical component configured, based on instructions from the shared platform 150 executable by the processor 112, to operate the device 110. The processor 112 included in the device 110 can comprise one or more processors configured to execute instructions from the shared platform 150 to operate the device 110.

The memory 114 can include one or more memories (e.g., flash memory, Random Access Memory (RAM), solid state drive, disk drive, etc.) that include software components configured to provide instructions pertaining to operation of the device 110. For example, the memory 114 can include a data storage memory configured to store data pertaining to the device such as dataset 140. Additionally or alternatively, the memory 114 can include a program logic memory (e.g., RAM) that includes the first application 120, the second application 122, the test interface 140, and/or the shared platform 150. In some examples, the memory 114 can be one physical component configured to store data and/or application components described above. Additionally, the memory 114 can include more software components than illustrated in FIG. 1. For example, the memory 114 can include a plurality of applications configured to provide operating instructions to the shared platform 150 to operate the device 110.

The first application 120 included in the memory 114 can be configured to provide instructions to the shared platform 150 pertaining to the operation of the device 110. For example, the first application 120 can provide operating instructions to the shared platform 150 that are executable by the shared platform 150, via processor 112, to operate the device 110. In some examples, the first application 120 can provide mode instructions to the shared platform 150. For example, the mode instructions can indicate that the shared platform 150 operate in a runtime mode, where the shared platform 150 executes operating instructions from the first application 120 to operate the device 110. In other examples, the mode instructions can indicate that the shared platform 150 operate in a test mode, where the shared platform 150 provides simulated responses to requests from the first application 120. The first application 120 can be any application that pertains to the operation of the device 110. For example, the first application 120 can be an email application configured to cause the device 110 to send an email. In some examples, the first application 120 can include a user interface configured to receive input from a user of the device 110 pertaining to the operation of the first application 120 and/or the device 110.

The second application 122 can be configured similarly to the first application 120. For example, the second application 122 can be a contact list application configured to receive and/or provide contact information such as name, email, phone number, etc.

In some examples, operation of the second application 122 can be based on instructions from the first application 120. For example, where the first application 120 is an image editing application and the second application 122 is a camera application, the first application 120 can provide instructions to the shared platform 150 indicative of the device 110 capturing an image using the second application 122. Thus, in this example, the shared platform 150 can cause the second application 122 to launch and provide the first application 120 with the image captured by the second application 122.

In another example, the second application 122 can perform an operation pertaining to the device 110 based on instructions from the first application 120. For example, the first application 120 can be a contact list application and the second application 122 can be a phone application. In this example, the first application 120 can provide instructions to the shared platform 150 indicative of calling a given contact included in the contact list application. Thus, in this example, the shared platform 150 can cause the second application 122 to launch and provide instructions to the shared platform 150 that are executable by the processor 112 to cause the device 110 to call the given contact.

The test interface 130 can include a software interface configured to receive instructions and/or information from the first application 120 pertaining to the dataset 140. In some examples, the test interface 130 can be an application programming interface (API) configured to receive information from the first application 120 for storage to and/or retrieval from the dataset 140. In other examples, the test interface 130 can include an independent application with a user interface. In that case, the test interface 130 can be an application similar to the first application 120 and the second application 130 that is configured to provide operating instructions to the shared platform 150. For example, the test interface 130 can provide operating instructions to the shared platform 150 indicative of the device 110 displaying the contents of the dataset 140.

In some examples, the test interface 130 can perform functions to determine information and structure thereof included in the dataset 140 based on instructions and/or information from the first application 120. For example, the test interface 130 can be configured to receive test information relating to simulated communication (e.g., interaction) between the first application 120 and the second application 122. Thus, the test interface 130 can be configured to determine, based on the test information, a plurality of test requests from the first application 120 and a plurality of test responses that indicate a simulation of the second application 122 receiving the plurality of test requests. For example, test requests of the plurality of test requests can correspond to test responses of the plurality of test responses. In this example, the test interface 130 can be configured to determine the dataset 140 to include the plurality of test requests and the corresponding plurality of test responses.

The dataset 140 is accessible by the test interface 130 and the shared platform 150 and includes the plurality of test requests and the plurality of test responses described above in the description of the test interface 130. In some examples, the dataset 140 can include a database with information pertaining to test cases of the first application 120. For example, the database can include the plurality of test requests from the first application 120 and the corresponding plurality of test responses pertaining to the operation of the second application 122. In some examples, the dataset 140 can include one or more databases pertaining to other applications configured to provide operating instructions executable by the shared platform 150. For example, the dataset 140 can include a first database for test information pertaining to testing the first application 120 and a second database for test information pertaining to testing the second application 122. In some examples, the dataset 140 can be included in the same physical memory as the first application 120. In other examples, the dataset 140 can be included in another physical memory. Although illustrated that dataset 140 is included in the memory 114, in some examples, the dataset 140 can be included in a second device (not shown in FIG. 1) and the test interface 130 can be configured to store and/or retrieve information from the dataset 140 by providing instructions to the shared platform 150 to cause the device 110 to communicate with the second device and perform these functions. Additionally or alternatively, in some examples, other components included in the memory 114 such as the first application 120 and the second application 122 can also be included in a remote memory accessible by the device 110.

Below is an example series of instructions from the first application 120 to the test interface 130 configured to cause the determining of the dataset 140.

Instruction 1: Add(Application="Contact List", Request="John", Response="1234567890").

Instruction 2: Add(Application="Contact List", Request="Mary", Response="0119876543210").

Instruction 3: Add(Application="Contact List", Request="Janet", Response="1234").

In this example, instruction 1 can cause the test interface 130 to create a test request directed to the "Contact List" application comprising a request for a contact named "John" to be associated with a response including a phone number "1234567890". Similarly, instructions 2 and 3 indicate contact information for "Mary" and "Janet". Thus, the test interface 130 can be configured to determine the dataset 140 to include the plurality of test requests (e.g., "John", "Mary", "Janet") from the first application 120 to the second application 122 (e.g., "Contact List" application) and the corresponding plurality of test responses (e.g., "1234567890", "0119876543210", "1234"). In this example, the first application 120 can test a variety of responses from the second application 122 to assert the behavior of the first application 120 without actually invoking the second application 122. For example, the test response "1234567890" associated with the test request "John" can correspond to a valid telephone number. Additionally, the test response "0119876543210" associated with the test request "Mary" can correspond to an international phone number (e.g., boundary test case, edge case, etc.). Additionally, the test response "1234" associated with the test request "Janet" can correspond to an invalid telephone number. Thus, in this example, the first application 120 can test the variety of responses that are possible from the second application 122 (e.g., "Contact List" application) without actually invoking the second application 122.

It is noted that the above example series of instructions is for explanatory purposes only and is not meant to limit the format, content, and/or type of instructions provided by the first application 120 to the test interface 130. For example, the first application 120 can provide instructions indicative of creating and/or deleting a database included in the dataset 140. In another example, the first application 120 can provide instructions indicative of removing one or more of the test cases included in the dataset 140. Additionally or alternatively to the first application 120 providing the instructions directly to the test interface 130, the instructions described above can be provided by the shared platform 150 to the test interface 130 based on instructions from the first application 120 to the shared platform 150.

The shared platform 150 can be configured to execute instructions, via the processor 112, to operate the device 110. In some examples, the shared platform 150 can be a native platform (e.g., platforms that operate smartphones, tablets, etc.) accessible by the other software components included in the memory 114 and can be configured to execute instructions pertaining to the operation of the device 110. For example, the device 110 can include a camera and the shared platform 150 can operate the camera based on instructions from the first application 120 and/or the second application 122. Additionally or alternatively, in some examples, the shared platform 150 can be an operating system of the device 110.

The shared platform 150 can optionally include multiple layers, each corresponding to a mode of behavior of the shared platform 150. In some examples, the shared platform 150 can include a runtime layer 152. The runtime layer 152 can correspond to the shared platform 150 operating in a runtime mode. For example, the shared platform 150 operating in the runtime mode can operate the device 110 in accordance with instructions included in the runtime layer 152. Additionally, the instructions included in the runtime layer 152 can include execution instructions adaptable based on instructions from the first application 120 and/or the second application 122. In some examples, the shared platform 150 can include a test layer 154. The test layer 154 can include instructions executable by the shared platform 150 to simulate the behavior of the runtime layer 152. For example, where the shared platform 150 is running in a test mode, the test layer 154 can include instructions to provide simulated responses to requests from the first application 120.

In some examples, the shared platform 150 can be configured to receive mode instructions from the first application 120 and/or the second application 122 indicative of the shared platform 150 operating in a runtime mode or a test mode. The runtime mode can correspond to the shared platform 150 executing operating instructions from the first application 120 to operate the device 110. For example, the shared platform 150 can be configured to execute the operating instructions in accordance with the runtime layer 152. The test mode can correspond to the shared platform 150 providing simulated responses to the first application 120. For example, the shared platform 150 can be configured to provide simulated responses in accordance with the test layer 154.

In some examples, a request can be received from the first application 120 by the shared platform 150. In some examples, the request can pertain to an operation of the second application 122. In some examples where the shared platform 150 is operating in the test mode, the shared platform 150 can be configured to determine a response to the request based on a simulation of providing the request to the second application 122. In examples where the first application 120 is sending a request pertaining to the second application 122 and based on the shared platform 150 operating in the test mode, the shared platform 150 can provide a simulated response to the first application 120 without invoking the second application 122. In one example, the response to the first application 120 can have a format substantially same as a format of the simulated response from the second application 122. For example, the first application 120 can be a navigation application and the second application 122 can be a map application. Thus, in this example, the first application 120 can request a destination address from the second application 122, and the shared platform 150 operating in the test mode can provide a simulated destination address to the first application 120 without invoking the second application 122. In another example, the response can correspond to a simulation of the second application 122 receiving the request from the first application 120. For example, the first application 120 can be an image settings application and the request can indicate adjusting brightness of an image in a photo gallery application (second application 122). In this example, the shared platform 150 operating in the test mode can determine a response indicative of the photo gallery application (second application 122) receiving the request from image settings application (first application 120).

In some examples, the shared platform 150 operating in the test mode can be configured to provide the determined response to the first application 120. In some examples, the shared application 150 operating in the test mode can be configured to receive a second request from the first application 120 indicative of the first application 120 requesting the response. In that case, the shared application 150 operating in the test mode can be configured to provide the response to the first application 120 based on receiving the second request.

In some examples, the shared platform 150 operating in the test mode can be configured to determine the response based on test responses included in the dataset 140. For example, the shared platform 150 can be configured to determine a given test request of the plurality of test requests included in the dataset 140 that is substantially same as the request from the first application. In this example, the shared platform 150 can be configured to determine a given test response of the plurality of test responses included in the dataset 140 that corresponds to the given test request. Further, in this example, the shared platform 150 can be configured to provide the given test response as the response.

Below is an example series of requests from the first application 120 received by the shared platform 150 pertaining to an operation of the second application 122 and a third application (not shown in FIG. 1). In this example, the first application 120 can be a contact information application (e.g., application that displays and/or uses contact details), the second application 122 can be a contact list application (e.g., application that provides a list of contacts for selection), and the third application (not shown in FIG. 1) can be a phone dialing application (e.g., application that causes the device 110 to dial a phone number).

Request 1: ChangeMode("test mode").
Request 2: PickContact("John").
Request 3: AssertTrue(isDisplayed("1234567890")).
Request 4: Dial(1234567890").
Request 5: Verify(Action.CALL("1234567890")).

In this example, request 1 is a first request from the first application 120 that corresponds to mode instructions that cause the shared platform 150 to operate in the test mode. Request 2 from the first application 120 to the shared platform 150 corresponds to the shared platform 150 receiving a selection from the second application 122. In this example, since the shared platform 150 is operating in the test mode, the shared platform 150 is instructed to simulate a phone number of the contact "John" rather than actually invoking the second application 122. For example, the shared platform 150 operating in the test mode can retrieve the phone number (e.g., "1234567890") from the dataset 140 in accordance with the description above. Request 3 corresponds to a third request from the first application 120 to the shared platform 150 to provide the response (the phone number of "John"). Additionally, request 3 includes asserting that the phone number returned from the shared platform 150 matches an expected phone number (e.g., "1234567890"). In some examples, request 3 can also include logging the result of the comparison between the returned response from the shared platform 150 and the expected response ("1234567890") in a log file. Request 4 includes a fourth request from the first application 120 to the shared platform 150 operating in the test mode indicative of simulating that the third application (e.g., the phone dialing application not shown in FIG. 1) dial the phone number retrieved in request 2. Request 5 includes a fifth request from the first application 120 to the shared platform 150 operating in the test mode indicative of requesting the response from the shared platform 150 that simulates that the third application received the call request from the first application 120.

In some examples, requests from the first application 120 can include additional steps not shown in the above series of requests and implemented in separate functions or procedures of the first application 120. For example, functions "PickContact" and "Dial" described, respectively, in requests 2 and 4 can include calls to respective functions or procedures of the first application 120. In some examples, the respective functions or procedures can provide the actual request to the shared platform 150.

It is noted that the above example series of requests is for explanatory purposes only and is not meant to limit the format, content, and/or type of requests provided by the first application 120 to the shared platform 150. For example, the first application 120 can provide instructions indicative of retrieving the test responses using a specific database included in the dataset 140.

It is noted that the block diagram shown in FIG. 1 is described in connection with functional modules for convenience in description. For example, while the functional block in FIG. 1 shown as the dataset 140 can be included in the memory 114, the dataset 140 does not necessarily need to be implemented as being physically present on the memory 114 but can be present in another memory included in the device 110 or included in a second device. In some examples, the embodiments of the device 110 can be arranged with one or more of the functional modules ("subsystems") implemented in a single chip, integrated circuit, and/or physical component.

Figure 2:
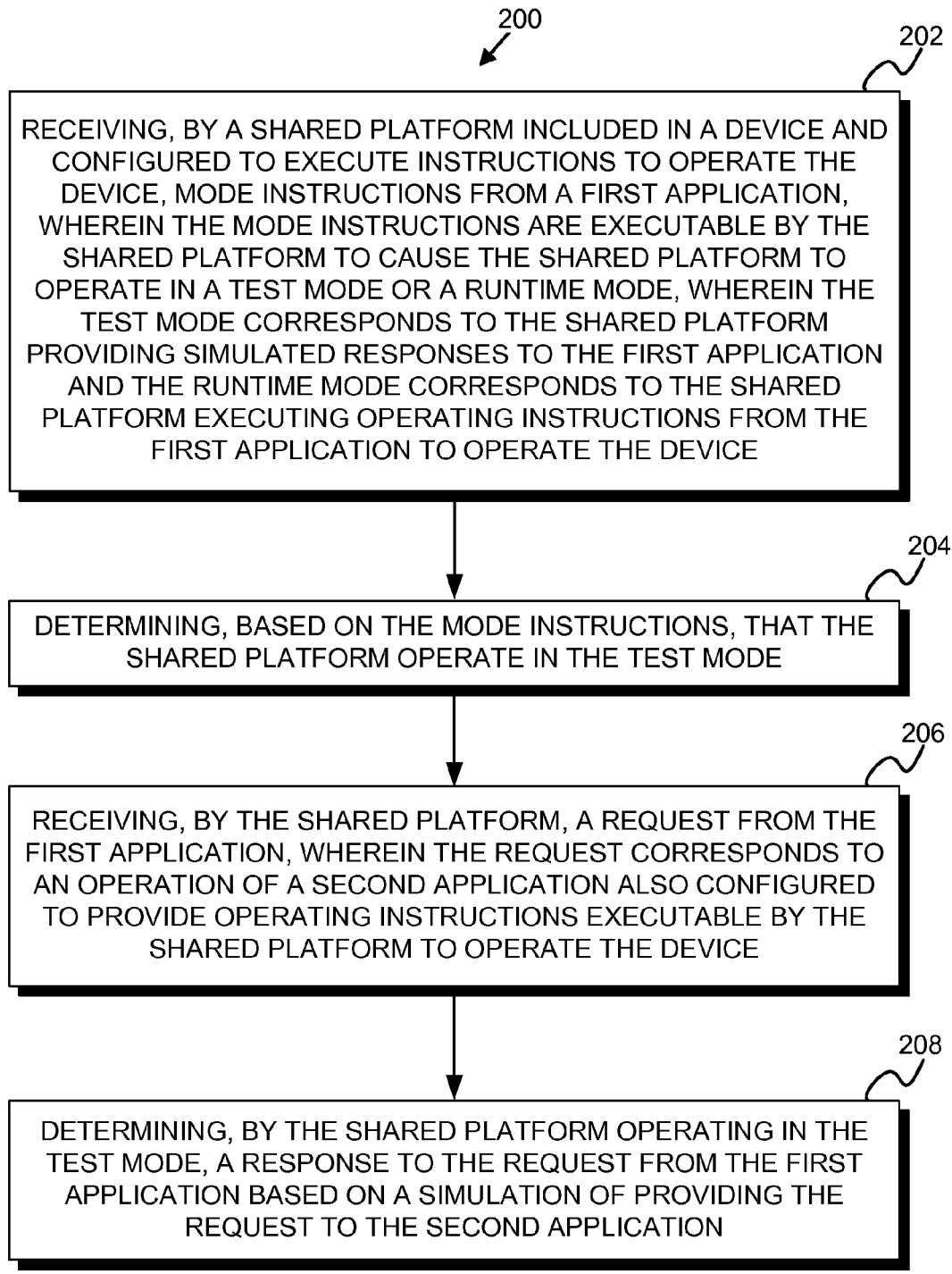
FIG. 2 is a block diagram of an example method for operating an example system including a shared platform configured to operate a device, in accordance with at least some embodiments described herein.

FIG. 2 is a block diagram of an example method 200 for operating an example system including a shared platform configured to operate a device, in accordance with at least some embodiments described herein. Method 200 shown in FIG. 2 presents an embodiment of a method that could be used with the system 100, for example. Method 200 may include one or more operations, functions, or actions as illustrated by one or more of blocks 202-208. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

At block 202, the method 200 includes receiving, by a shared platform included in a device and configured to execute instructions to operate the device, mode instructions from a first application, wherein the mode instructions are executable by the shared platform to cause the shared platform to operate in a test mode or a runtime mode, wherein the test mode corresponds to the shared platform providing simulated responses to the first application and the runtime mode corresponds to the shared platform executing operating instructions from the first application to operate the device.

At block 204, the method 200 includes determining, based on the mode instructions, that the shared platform operate in the test mode.

At block 206, the method 200 includes receiving, by the shared platform, a request from the first application, wherein the request corresponds to an operation of a second application also configured to provide operating instructions executable by the shared platform to operate the device.

At block 208, the method 200 includes determining, by the shared platform operating in the test mode, a response to the request from the first application based on a simulation of providing the request to the second application.

For example, the shared platform can be a mobile platform configured to operate a device (e.g., tablet, smartphone, personal digital assistant, etc.). The shared platform can receive mode instructions from a first application (block 202) indicative of operating in a test mode (block 204). The shared platform can receive a request (block 206) from the first application corresponding to an operation of a second application. For example, the first application can be messaging application requesting an email address from the second application that is a contact list application. Thus, the shared platform operating in the test mode (block 208) can determine a response to the request without invoking the second application (e.g., provide a canned response such as an email address).

Figure 3:
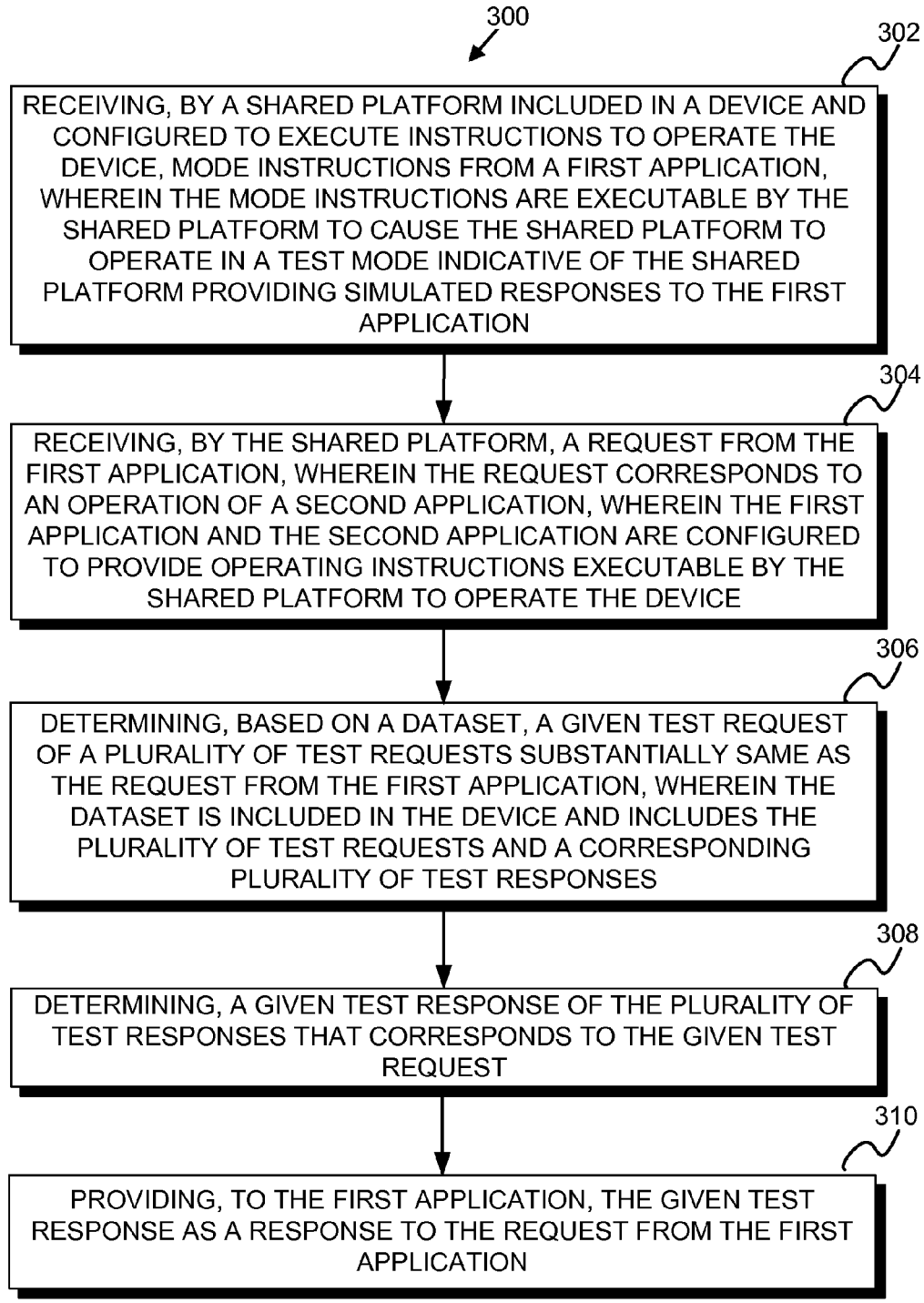
FIG. 3 is a block diagram of an example method for operating an example system including a dataset, in accordance with at least some embodiments described herein.

FIG. 3 is a block diagram of an example method 300 for operating an example system including a dataset, in accordance with at least some embodiments described herein. Method 300 shown in FIG. 3 presents an embodiment of a method that could be used with the system 100, for example. Method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving, by a shared platform included in a device and configured to execute instructions to operate the device, mode instructions from a first application, wherein the mode instructions are executable by the shared platform to cause the shared platform to operate in a test mode indicative of the shared platform providing simulated responses to the first application.

At block 304, the method 300 includes receiving, by the shared platform, a request from the first application, wherein the request corresponds to an operation of a second application, wherein the first application and the second application are configured to provide operating instructions executable by the shared platform to operate the device.

At block 306, the method 300 includes determining, based on a dataset, a given test request of a plurality of test requests substantially same as the request from the first application, wherein the dataset is included in the device and includes the plurality of test requests and a corresponding plurality of test responses.

At block 308, the method 300 includes determining, a given test response of the plurality of test responses that corresponds to the given test request.

At block 310, the method 300 includes providing, to the first application, the given test response as a response to the request from the first application.

For example, the shared platform can be a platform configured to operate a device (e.g., computing device, wearable device, etc.). The shared platform can receive mode instructions from a first application (block 302) indicative of operating in a test mode. The shared platform can receive a request (block 304) from the first application corresponding to an operation of a second application. For example, the first application can be a navigation application requesting an address of a location (e.g., city hall, etc.) from the second application that is a map application. For example, the shared platform can identify a location in the dataset substantially same as the location in the request (block 306) from the first application (e.g., city hall). The shared platform operating in the test mode can then be configured to retrieve a corresponding test response such as a simulated address (e.g., city hall's address) as a response to the request using a dataset included in the device (block 308) without invoking the second application. Thus, the shared platform operating in the test mode (block 310) can provide the test response as the response to the request from the first application.

Figure 4:
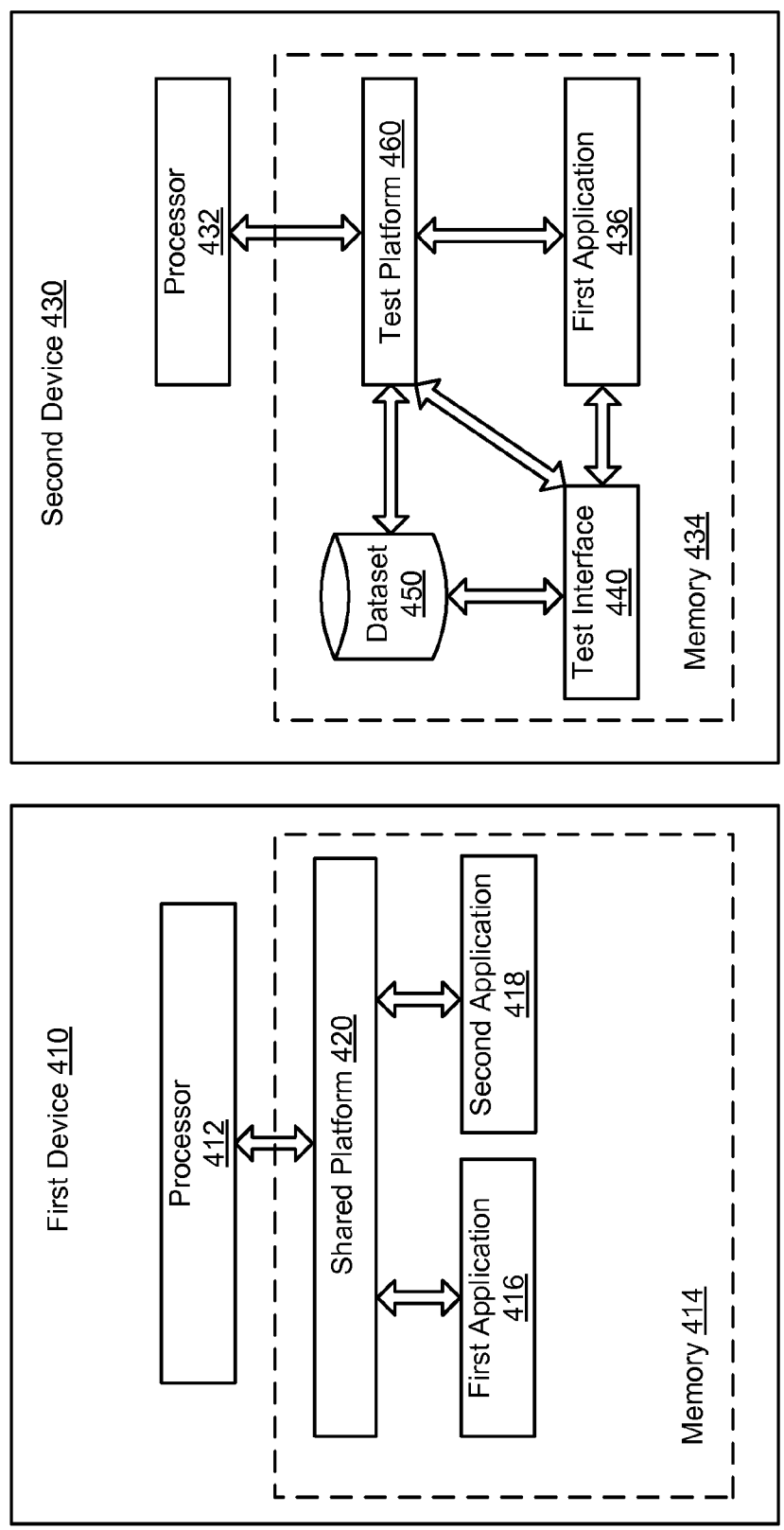
FIG. 4 is a block diagram of an example system including a test platform.

FIG. 4 is a block diagram of an example system 400 including a test platform 460. The system 400 illustrates an example system for testing interaction between a first application 416 and a second application 418 that are each configured to provide operating instructions executable by a shared platform 420 included in a first device 410 to operate the first device 410. Furthermore, the system 400 provides a method for testing the first application 416 by a test platform 460 included in a second device 430. The test platform 460 can be configured to simulate operation of the shared platform 420. In some examples, the first application 436 included in the second device 430 can be a copy of the first application 416 included in the first device 410. In other examples, the first application 436 included in the second device 430 can be a test version of the first application 416 included in the first device 410.

The first device 410 can be similar to the device 110 described in the system 100 of FIG. 1. For example, the first device 410 can include a processor 412 configured to execute instructions from the shared platform 420 included in the memory 414 to operate the first device 410. The shared platform 420 can receive the operating instructions executable by the processor 412 from the first application 416 and the second application 418 included in the memory 414. The operation, function, and structure of the processor 412, memory 414, first application 416, second application 418, and the shared platform 420 can be similar, respectively, to the processor 112, memory 114, first application 120, second application 122, and the shared platform 150 described in the system 100 illustrated in FIG. 1.

The system 400 also includes a second device 430 that includes a processor 432, and a memory 434. The memory 434 can include instructions executable by the processor 432 to operate the second device 430. The instructions can include software components such as a first application 436, a test interface 440, a dataset 450, and the test platform 460.

The second device 430 can be a computing device such as a personal computer, server computer, etc. configured to operate based on instructions executable by the test platform 460 to simulate operation of the first device 410. For example, the first device 410 can be a mobile device and the second device 430 can be a test device configured to simulate the operation of the mobile device. In addition, the test platform 460 can be configured to simulate operation of the shared platform 420. For example, the test platform 460 can be an emulator configured to display output and receive input similar to that of the shared platform 420 included in the first device 410. Thus, the system 400 provides a mechanism for testing the first application 416 without the presence of the second application 418 or the first device 410 in contrast with the system 100 described in FIG. 1. For example, the first application 436 included in the second device 430 can be a copy of the first application 416 included in the first device 410 or can be a test version (e.g., test suite) of the first application 416. Thus, the system 400 provides a method for testing operation of the first device 410 including the interaction between the first application 416 and the second application 418 without the presence of the first device 410, the shared platform 420, and/or the second application 418.

The second device 430 includes a processor 432 configured to execute instructions from the test platform 460 to operate the second device 430 that simulates the behavior of the first device 410.

The physical aspects of the memory 434 can be similar to the memory 114 described in FIG. 1. For example, the memory 434 can include one or more memories including the first application 436, the test interface 440, the dataset 450, and/or the test platform 460.

The first application 436 can provide instructions executable by the test platform 460 to simulate the behavior of the first device 410. For example, the first application 436 can be a copy of the first application 416 included in the first device 410.

The structure, function and operation of the test interface 440 and the dataset 450 is similar to the test interface 130 and the dataset 140 included in the description of FIG. 1. For example, the first application 436 can provide requests to the test platform 460 that cause the test platform 460 to retrieve test responses from the dataset 450 that were created using the test interface 440.

The test platform 460 can be configured to simulate the behavior of the shared platform 420 included in the first device 410. For example, the test platform 460 can receive a request from the first application 436 pertaining to the operation of a second application (not shown and/or included in the second device 430). Thus, the test platform 460 can provide a simulated response to the first application 436 based on a simulation of providing the request to the second application.

In some examples, the test platform 460 can determine the simulated response to the request based on a simulation of the operation of the second application to simulate information output from the second application. For example, where the second application is not included in the second device 430, the test platform 460 can simulate the output of the second application (e.g., by retrieving data from the dataset 450). In other examples, the test platform 460 can provide the simulated response indicative of the second application receiving the request from the first application 436.

In some examples, the test platform 460 can be configured to receive mode instructions from the first application 436 indicative of the test platform 460 operating in a simulated interaction mode. The simulated interaction mode can correspond to the test platform 460 providing simulated responses to requests from the first application 436 pertaining to the operation of the second application. The test platform 460, for example, can receive a request form the first application 436 pertaining to the operation of the second application. In this example, the test platform 460 operating in the simulated interaction mode can determine a response to the request based on a simulation of providing the request to the second application. For example, the first application 436 can be a messaging application requesting an email address from the second application that is a contact list application. In this example, the test platform 460 operating in the simulated interaction mode can determine a response to the request such as an email address stored in the dataset 450. Thus, in this example, the response can correspond to a simulated response from the second application without invoking the second application. In another example, the response can be indicative of the test platform 460 providing the request to the second application. For example, the second application can be a dialing application and the first application 436 can provide a request to dial a phone number. In this example, the test platform 460 can provide a response indicative of the second application receiving the request to dial the phone number.

Similarly to the shared platform 150 described in FIG. 1, the test platform 460 can be configured to perform additional functions such as providing the response to the first application 436, receiving a second request indicative of the first application 436 requesting the response and providing the response based on receiving the second request, and determining the response based on a plurality of test requests and a corresponding plurality of test responses included in the dataset 450.

Thus, the test platform 460 in the second device 430 provides a mechanism to perform the test functionality of the shared platform 420, included in the first device 410, on the second device 430 without the presence of the second application 418 or the first device 410.

Figure 5:
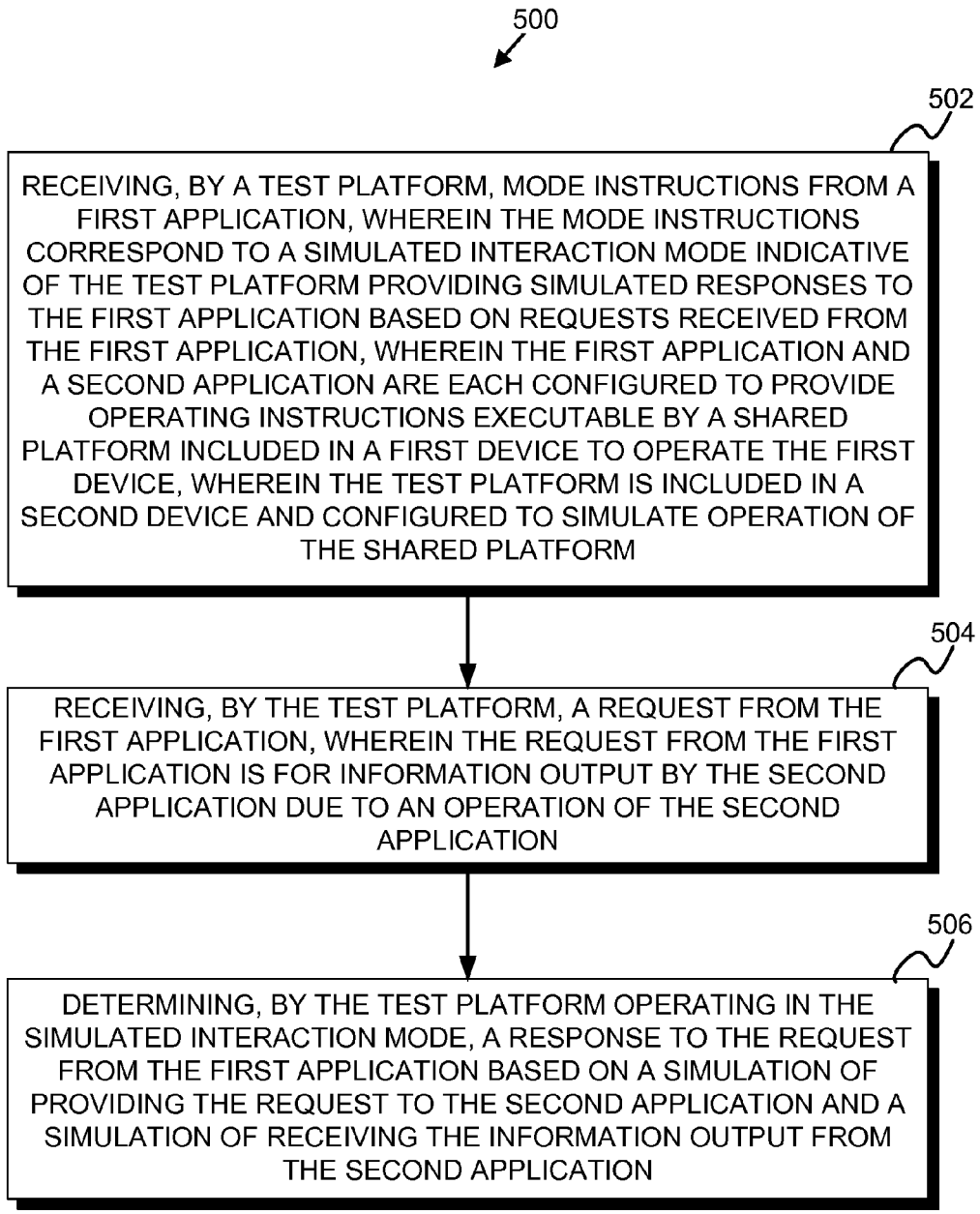
FIG. 5 is a block diagram of an example method for operating an example system including a test platform, in accordance with at least some embodiments described herein.

FIG. 5 is a block diagram of an example method 500 for operating an example system including a test platform, in accordance with at least some embodiments described herein. Method 500 shown in FIG. 5 presents an embodiment of a method that could be used with the system 400, for example. Method 500 may include one or more operations, functions, or actions as illustrated by one or more of blocks 502-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes receiving, by a test platform, mode instructions from a first application, wherein the mode instructions correspond to a simulated interaction mode indicative of the test platform providing simulated responses to the first application based on requests received from the first application, wherein the first application and a second application are each configured to provide operating instructions executable by a shared platform included in a first device to operate the first device, wherein the test platform is included in a second device and configured to simulate operation of the shared platform.

At block 504, the method 500 includes receiving, by the test platform, a request from the first application, wherein the request from the first application is for information output by the second application due to an operation of the second application.

At block 506, the method 500 includes determining, by the test platform operating in the simulated interaction mode, a response to the request from the first application based on a simulation of providing the request to the second application and a simulation of receiving the information output from the second application.

For example, the test platform can be included in the second device (e.g., personal computer, etc.) and configured to simulate the behavior of the shared platform that is included in the first device. The test platform can receive mode instructions from a first application (bock 502) indicative of operating in the simulated interaction mode. The test platform can receive a request (block 504) from the first application for information output by a second application due to an operation of the second application. For example, the first application can be a photo editing application requesting an image to be captured by the second application that is a camera application. Thus, the test platform operating in the simulated interaction mode (block 506) can determine a response to the request without invoking the second application (e.g., determine a canned response such as an image of a person).

Figure 6:
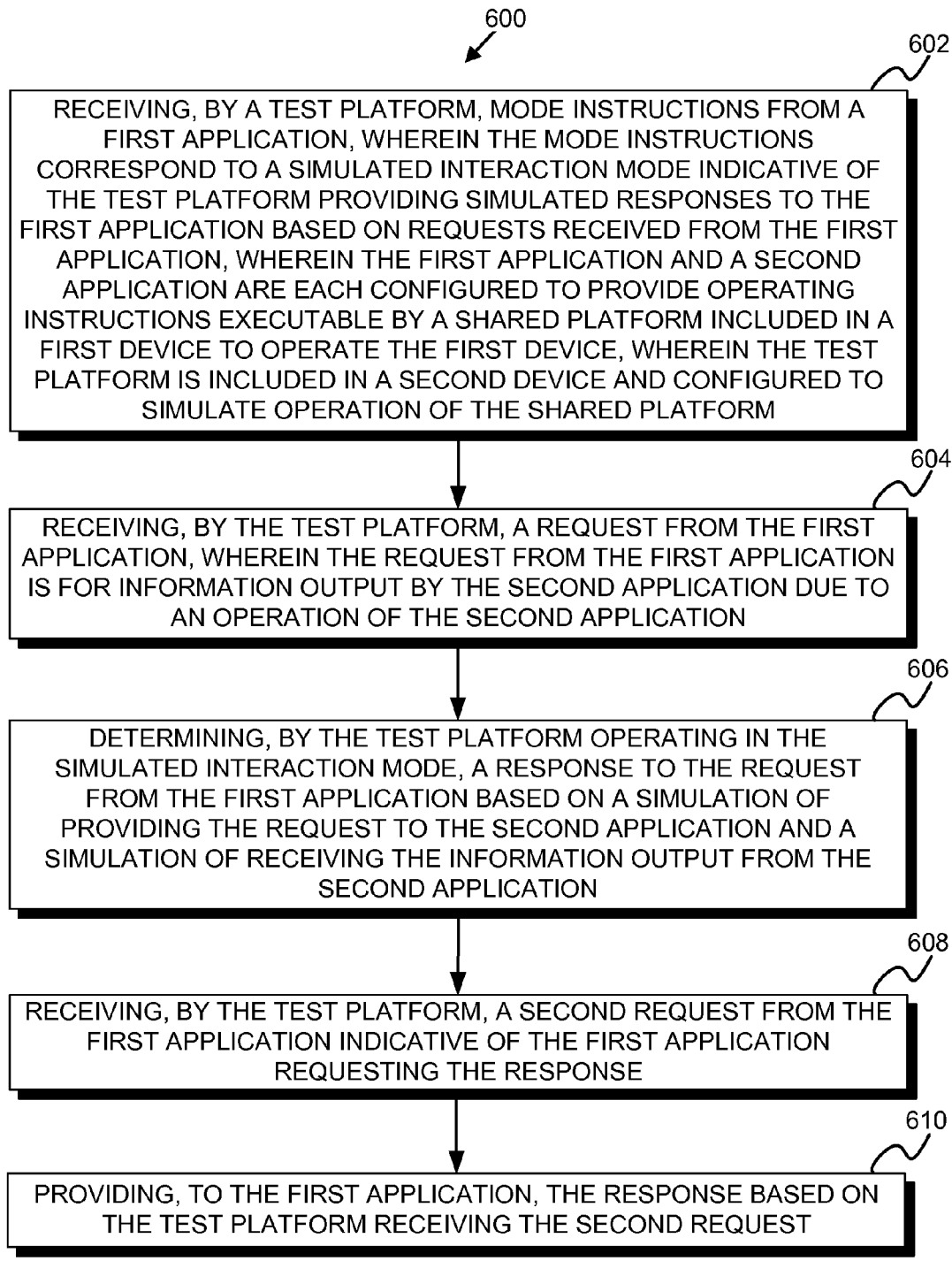
FIG. 6 is a block diagram of an example method for operating an example system including a test platform that provides a response to a request from a first application based on receiving a second request from the first application.

FIG. 6 is a block diagram of an example method 600 for operating an example system including a test platform that provides a response to a request from a first application based on receiving a second request from the first application. Method 600 shown in FIG. 6 presents an embodiment of a method that could be used with the system 400, for example. Method 600 may include one or more operations, functions, or actions as illustrated by one or more of blocks 602-610. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 600 and other processes and methods disclosed herein, each block in FIG. 6 may represent circuitry that is wired to perform the specific logical functions in the process.

At block 602, the method 600 includes receiving, by a test platform, mode instructions from a first application, wherein the mode instructions correspond to a simulated interaction mode indicative of the test platform providing simulated responses to the first application based on requests received from the first application, wherein the first application and a second application are configured to provide operating instructions executable by a shared platform included in a first device to operate the first device, wherein the test platform is included in a second device and configured to simulate operation of the shared platform.

At block 604, the method 600 includes receiving, by the test platform, a request from the first application, wherein the request from the first application is for information output by the second application due to an operation of the second application.

At block 606, the method 600 includes determining, by the test platform operating in the simulated interaction mode, a response to the request from the first application based on a simulation of providing the request to the second application and a simulation of receiving the information output from the second application.

At block 608, the method 600 includes receiving, by the test platform, a second request from the first application indicative of the first application requesting the response.

At block 610, the method 600 includes providing, to the first application, the response based on the test platform receiving the second request.

For example, the test platform can be included in the second device (e.g., personal computer, etc.) and configured to simulate the behavior of the shared platform that is included in the first device (e.g., tablet, smartphone, etc.). The test platform can receive mode instructions from a first application (block 602) indicative of operating in the simulated interaction mode. The test platform can receive a request (block 604) from the first application for information output by a second application due to an operation of the second application. For example, the first application can be text editing application requesting a document to be saved by the second application that is a file manager application. Thus, the test platform operating in the simulated interaction mode (block 606) can determine a response to the request without invoking the second application (e.g., determine a response indicative of the file manager receiving the document and path and providing information indicative of successfully saving the document). The test platform can then receive a second request (block 608) from the first application indicative of the first application requesting the response (e.g., verification that the second application received and/or saved the document). Thus, the test platform can provide the response to the first application based on receiving the second request (block 610).

Figure 7:
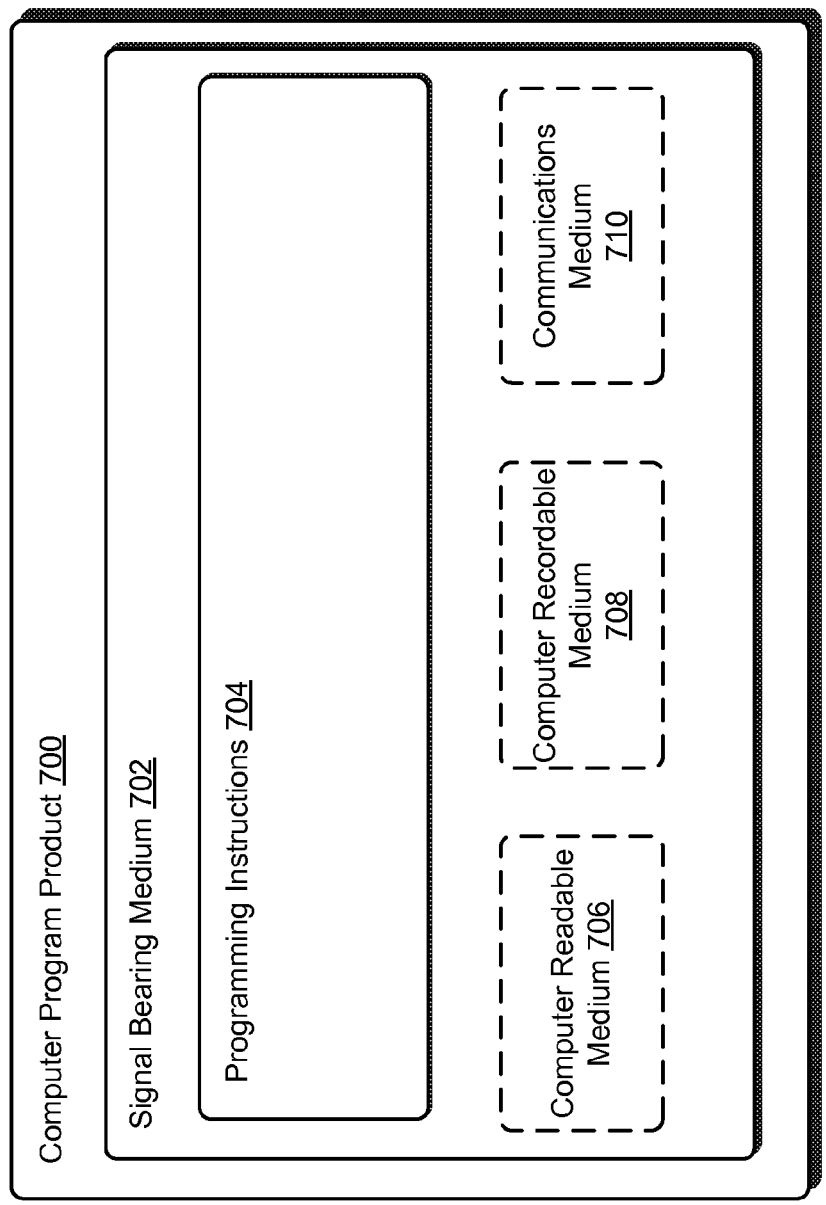
FIG. 7 depicts an example computer-readable medium configured according to at least some embodiments described herein.

FIG. 7 depicts an example computer-readable medium configured according to at least some embodiments described herein. In example embodiments, the example system can include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. methods 200, 300, 500, and 600) can be implemented by computer program instructions encoded on a computer readable storage media in a machine-readable format, or on other media or articles of manufacture (e.g., the instructions stored on the memory 114 of the device 110 of the system 100, or the instructions stored on the memory 434 of the device 430 of the system 400). FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 can be a computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communication medium 710 (e.g., a fiber optic cable, a waveguide, a wired communications link, a wireless communication link, etc.). Thus, for example, the signal bearing medium 702 can be conveyed by a wireless form of the communications medium 710.

The one or more programming instructions 704 can be, for example, computer executable and/or logic implemented instructions. In some examples, a computing device such as the processor-equipped devices 110 and 430 of FIGS. 1 and 4 is configured to provide various operations, functions, or actions in response to the programming instructions 704 conveyed to the computing device by one or more of the computer readable medium 706, the computer recordable medium 708, and/or the communications medium 710. In other examples, the computing device can be an external device such as a server or personal computer in communication with a device such as device 110 or device 430.

The computer readable medium 706 can also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server. For example, the computer program product 700 can implement the functionalities discussed in the description of FIGS. 1-6.

Within examples, operation methods that are described for the testing systems can be applied to other testing systems that pertain to an operation of a device by a shared platform receiving instructions from two or more interacting applications. For example, medical devices, special purpose computers, and computer automated vehicles can perform the functions described herein to test interactions between applications included in these devices. Thus, example methods herein provide testing of interactions between a first application and a second application based on requests from the first application pertaining to an operation of the second application and without invoking the second application.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, by a shared platform executed by one or more processors in a device for operation of the device, mode instructions from a first application stored on the device, wherein the mode instructions are executable by the one or more processors to cause the shared platform to operate in a test mode or a runtime mode, wherein the test mode corresponds to the shared platform providing simulated responses to the first application and the runtime mode corresponds to the shared platform executing operating instructions from the first application to operate the device;

determining, based on the mode instructions, that the shared platform operate in the test mode;

receiving, by the shared platform, a request from the first application, wherein the request corresponds to an operation of a second application stored on the device and also configured to provide operating instructions executable by the shared platform to operate the device;

simulating, by the shared platform, the second application receiving the request from the first application and performing the operation based on the request;

determining, by the shared platform operating in the test mode, a response to the request from the first application based on the simulation of providing the request to the second application and without the one or more processors causing the shared platform to invoke the second application and without the one or more processors causing the shared platform to send the request to the second application; and providing, by the shared platform, the response to the first application, wherein the device includes a dataset accessible by the shared platform, wherein the dataset includes a plurality of test requests from the first application and a plurality of test responses, wherein test requests of the plurality of test requests correspond to test responses of the plurality of test responses, and determining the response to the request includes:

determining, based on the dataset, a given test request of the plurality of test requests that is the same as the request from the first application;

determining a given test response of the plurality of test responses that corresponds to the given test request; and providing the given test response as the response.

2. The method of claim 1, wherein the shared platform operating in the runtime mode is configured, based on the first application and the second application being included in the device, to execute the operating instructions from the first application and the second application to operate the device.

3. The method of claim 1, wherein the response corresponds to a simulated response from the second application.

4. The method of claim 1, further comprising:

providing the response to the first application based on the shared platform receiving a second request from the first application requesting the response.

5. The method of claim 1, further comprising:

receiving, by a test interface included in the device and configured to receive information from the first application, test information relating to simulated communication between the first application and the second application;

determining, by the test interface and based on the test information, the plurality of test requests and the plurality of test responses; and determining, by the test interface, the dataset accessible by the shared platform including the plurality of test requests and the plurality of test responses.

6. A method for testing interaction between a first application and a second application that are each configured to provide operating instructions executable by a shared platform included in a first device to operate the first device, the method comprising:

receiving, by a second device including one or more processors that execute a test platform included in the second device to simulate operation of the shared platform that is included in the first device, mode instructions from the first application, wherein the mode instructions correspond to a simulated interaction mode indicative of the test platform providing simulated responses to the first application based on requests received from the first application;

receiving, by the second device at the test platform, a request from the first application, wherein the request from the first application is for information output by the second application due to an operation of the second application;

simulating, by the second device through execution of the test platform, the second application receiving the request from the first application and performing the operation based on the request;

determining, by the second device with the test platform operating in the simulated interaction mode, a response to the request from the first application based on the simulation of providing the request to the second application and the simulation of receiving the information output from the second application and also without the one or more processors causing the test platform to invoke the second application and without the one or more processors causing the test platform to send the request to the second application; and providing, by the test platform, the response to the first application, wherein the test platform is configured to obtain test information from a dataset, wherein the dataset includes a plurality of test requests from the first application and a plurality of test responses, wherein test requests of the plurality of test requests correspond to test responses of the plurality of test responses, the method further comprising:

determining, based on the dataset, a given test request of the plurality of test requests that is the same as the request from the first application;

determining a given test response of the plurality of test responses that corresponds to the given test request; and providing the given test response as the response.

7. The method of claim 6, wherein the response is indicative of the test platform simulating that the second application received the request from the first application.

8. The method of claim 6, further comprising:

providing the response to the first application based on the shared platform receiving a second request from the first application requesting the response.

9. The method of claim 6, further comprising:

receiving, by a test interface included in the first device and configured to receive the test information from the first application, the test information relating to simulated communication between the first application and the second application;

determining, by the test interface and based on the test information, the plurality of test requests and the plurality of test responses; and determining, by the test interface, the dataset accessible by the test platform including the plurality of test requests and the plurality of test responses.

10. A non-transitory computer readable medium having stored therein instructions, that when executed by a computing device, cause the computing device to perform functions, the functions comprising:

receiving, by a shared platform executed by one or more processors in a computing device for operation of the computing device, mode instructions from a first application stored on the computing device, wherein the mode instructions are executable by the one or more processors to cause the shared platform to operate in a test mode or a runtime mode, wherein the test mode corresponds to the shared platform providing simulated responses to the first application and the runtime mode corresponds to the shared platform executing operating instructions from the first application to operate the computing device;

determining, based on the mode instructions, that the shared platform operate in the test mode;

receiving, by the shared platform, a request from the first application, wherein the request corresponds to an operation of a second application stored on the computing device and also configured to provide operating instructions executable by the shared platform to operate the computing device;

simulating, by the shared platform, the second application receiving the request from the first application and performing the operation based on the request;

determining, by the shared platform operating in the test mode, a response to the request from the first application based on the simulation of providing the request to the second application and without the one or more processors causing the shared platform to invoke the second application and without the one or more processors causing the shared platform to send the request to the second application; and providing, by the shared platform, the response to the first application, wherein the computing device includes a dataset accessible by the shared platform, wherein the dataset includes a plurality of test requests from the first application and a plurality of test responses, wherein test requests of the plurality of test requests correspond to test responses of the plurality of test responses, the functions further comprising:

determining, based on the dataset, a given test request of the plurality of test requests that is the same as the request from the first application;

determining a given test response of the plurality of test responses that corresponds to the given test request; and providing the given test response as the response.

11. The non-transitory computer readable medium of claim 10, the functions further comprising:

providing the response to the first application based on the shared platform receiving a second request from the first application requesting the response.

12. The non-transitory computer readable medium of claim 10, the functions further comprising:

receiving, by a test interface included in the computing device and configured to receive information from the first application, test information relating to simulated communication between the first application and the second application;

determining, by the test interface and based on the test information, the plurality of test requests and the plurality of test responses; and determining, by the test interface, the dataset accessible by the shared platform including the plurality of test requests and the plurality of test responses.

* * * * *